Feb. 20, 1923.
R. W. NEWCOMB
DEVICE FOR CONTROLLING ROTARY MOTION OF SHAFTS, ETC
Filed Feb. 9, 1921
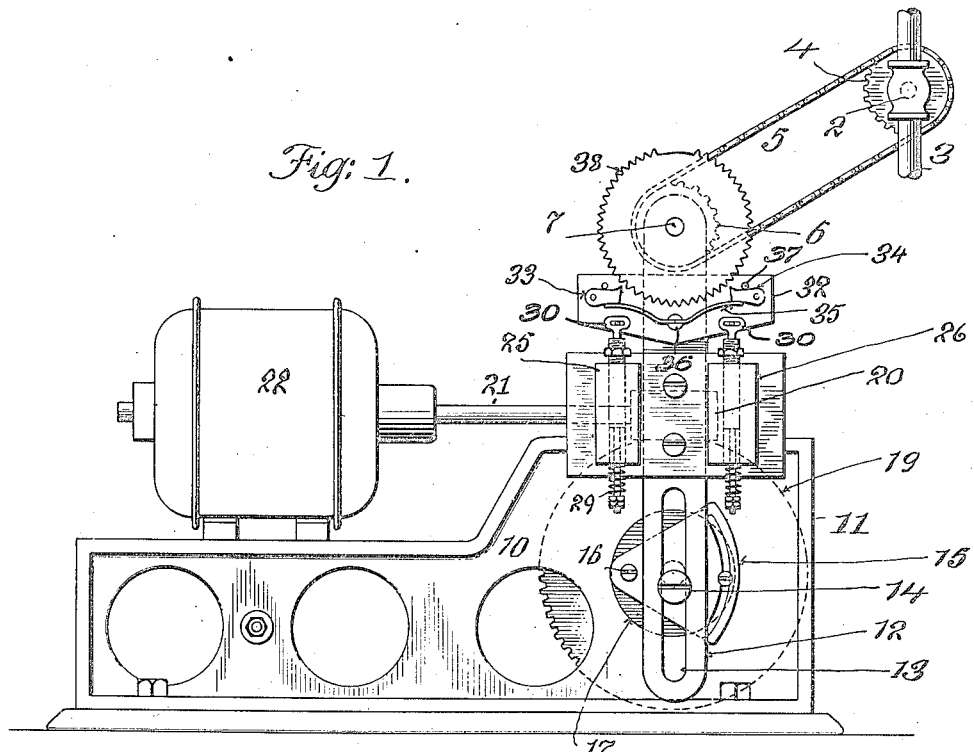
Fig: 1.
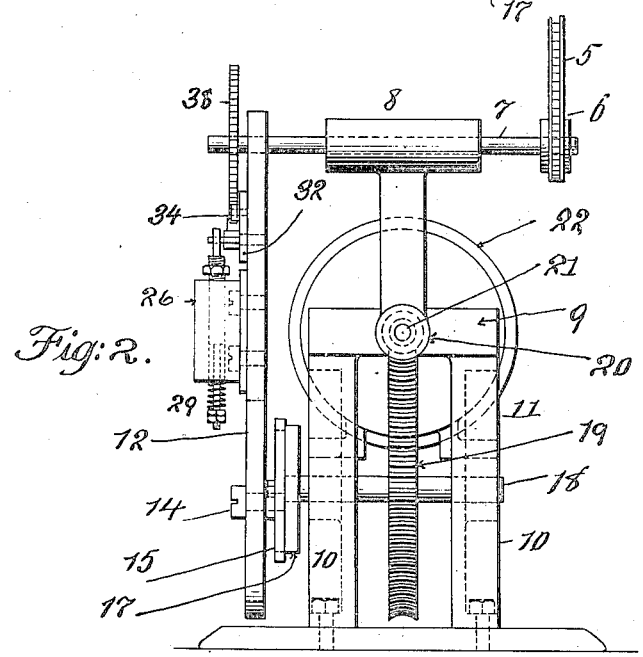
Fig: 2.
Inventor
Ralph W. Newcomb
By his Attorney
Park Benjamin

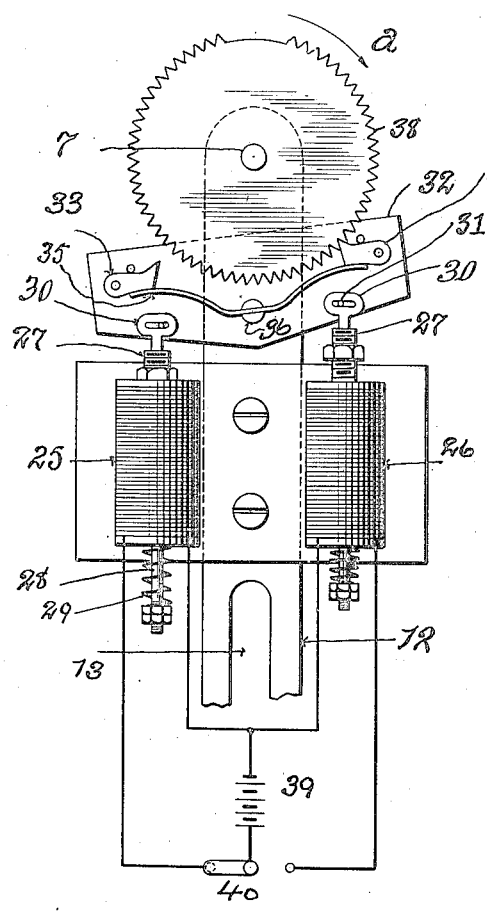
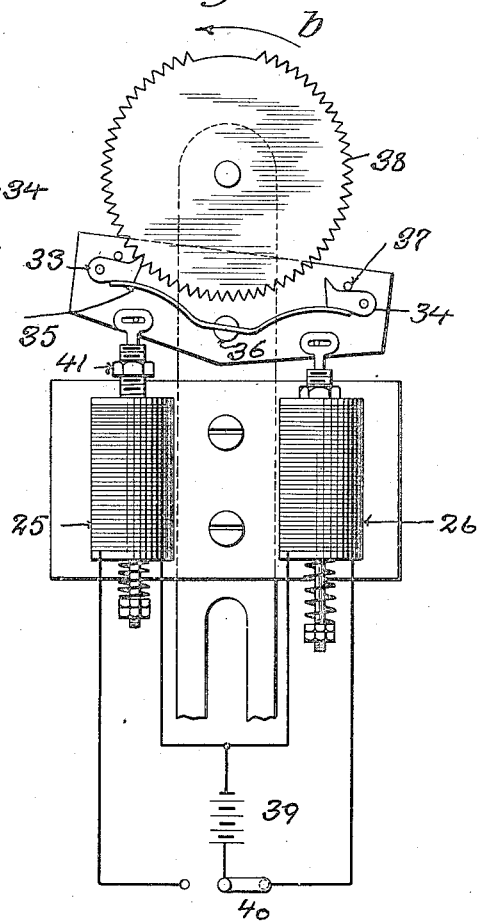
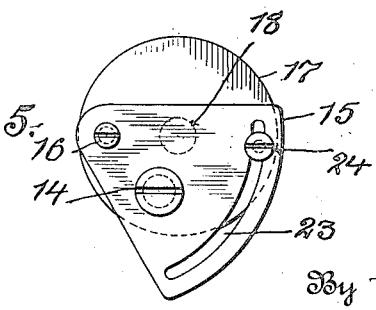

Patented Feb. 20, 1923.

1,446,267

UNITED STATES PATENT OFFICE.

RALPH W. NEWCOMB, OF GREEN VILLAGE, NEW JERSEY.

DEVICE FOR CONTROLLING ROTARY MOTION OF SHAFTS, ETC.

Application filed February 9, 1921. Serial No. 443,510.

*To all whom it may concern:*

Be it known that I, RALPH W. NEWCOMB, a citizen of the United States, residing at Green Village, in the county of Morris and State of New Jersey, have invented a certain new and useful Improvement in Devices for Controlling Rotary Motion of Shafts, Etc., of which the following is a specification.

The invention is a device for controlling rotary motion of a shaft, spindle or other rotatable member, whereby said member may be caused to rotate in either direction in order to operate a valve or for any other purpose, at the will of the operator. It is susceptible to a large variety of applications, such as the regulation of temperature, pressure, liquid flow, mechanical motion, furnace rheostats and dampers, the mixing of gases in fixed ratio to one another, and the operation of valves from a distant point. The invention consists in the construction more particularly hereinafter set forth.

In the accompanying drawings—

Fig. 1 is a side elevation of my regulator. Fig. 2 is an end elevation. Figs. 3 and 4 are similar enlarged side elevations of the upper portion of the device, showing the positions of the yoke plate and actuating plunger armatures when different pawls are in engagement with the ratchet. Fig. 5 is an enlarged face view of the device for varying the amplitude of vibration of the lever 12.

Similar letters of reference indicate like parts.

My regulator is here shown applied to controlling a faucet valve 2 in pipe 3. On the valve shaft is a sprocket 4 which by sprocket chain 5 receives motion from a sprocket 6 on the shaft 7. Said shaft is supported in a sleeve 8 upon an upright secured upon cross bar 9 which extends between the side walls 10 of the machine bed 11, Fig. 2.

Supported upon shaft 7 and swinging thereon is a lever 12 having a long slot 13 which receives a stud 14 on the face of sector plate 15. Said plate is pivoted at 16 to the face of a disk 17 which is fast on one end of shaft 18. Shaft 18 is journaled in the side walls 10 of the bed 11 and between said walls carries a pinion 19, with which engages the worm 20 on the shaft 21 of an electric motor 22 which is supported on bed 11. In the sector plate 15 is an arc-shaped slot 23, in which slot is a clamping pin 24 entering disk 17, Fig. 5. By moving the sector plate 15 on its pivot, the distance of the stud from the center of disk 17 may be varied, and in this way I may adjust the amplitude of vibration of the lever 12.

Fast upon the lever 12 is a plate carrying two upright solenoids 25 and 26. The plunger armatures 27 of said solenoids at their lower ends are provided with rods 28, on which are helical retracting springs 29. On the upper ends of said armatures are horizontally slotted plates 30. The slots in plates 30 receive pins 31 on a yoke plate 32 pivoted at its middle portion to lever 12. Also on said plate are pivoted two pawls 33, 34. The lower sides of said pawls bear against the arms of a leaf spring 35 which is secured at its middle portion to said yoke plate by a pin 36. The upper sides of said pawls bear against stops 37 on yoke plate 32. The pawls 33, 34 are in cooperative relation to a ratchet wheel 38 on shaft 7.

The coils of solenoids 25, 26 are in parallel with a battery 39, Figs. 3 and 4, which may be connected in circuit with either solenoid, or be cut out altogether by switch 40.

The upper portions of the plunger armatures are threaded and provided with check nuts 41 which limit the downward movement of said armatures. The retracting springs 29 oppose one another and hold the yoke plate 32 in a neutral position when neither solenoid is energized, at which time both of the pawls 33, 34 are out of engagement with ratchet wheel 38 and are held up against their stops by spring 35.

When the switch 40 is set to close circuit to solenoid 25, said yoke plate is tilted as shown in Fig. 3, so that the pawl 34 comes into engagement with ratchet wheel 38, and can operate to rotate said wheel in the direction of the arrow $a$. When the switch 40 is set to close circuit to solenoid 26, said yoke plate is tilted as shown in Fig. 4, so that the pawl 33 comes into engagement with ratchet wheel 38, and can operate to rotate said wheel in the opposite direction— that is to say, in the direction of arrow $b$. And in either case the operation takes place during one half of each revolution of stud 14.

I claim:

1. A device for controlling rotary motion comprising a motor, a vibrating lever actuated by said motor, a shaft, transmitting mechanism for converting the vibrating movement of said lever into rotary motion of said shaft, and manually operable means for electrically controlling the direction of rotation of said shaft, the said transmitting mechanism for converting the vibratory movement of said lever being a ratchet wheel on said shaft, a pivoted yoke on said lever, two pawls on said yoke cooperating with said ratchet wheel, and fixed electromagnetic means on said lever for tilting said yoke to bring either of said pawls into engagement with said ratchet.

2. A device for controlling rotary motion, comprising a motor, a shaft rotated thereby, a second shaft, a swinging lever, a pivoted yoke plate on said lever, a ratchet wheel on said second shaft, a pawl on said yoke plate cooperating with said ratchet wheel, and a solenoid fixed on said lever and controlling the tilting of said yoke plate thereon to cause engagement of said pawl and said ratchet wheel to actuate said second shaft.

3. A device for controlling rotary motion, comprising a shaft, a ratchet wheel on said shaft, a swinging lever pivoted at its upper end, a yoke plate pivoted on said lever, spring pawls on said yoke plate adapted to engage said ratchet wheel, a fixed plate on said lever, two upright solenoids on said fixed plate, plunger armatures for said solenoids, slotted plates at the upper ends of said armatures, pins on said yoke plate entering said slots, means for energizing either solenoid to cause one or the other of said pawls to cooperate with said ratchet wheel, and means for continuously vibrating said swinging lever to cause through said pawl and ratchet mechanism the rotation of said first-named shaft.

In testimony whereof I have affixed my signature in presence of two witnesses.

RALPH W. NEWCOMB.

Witnesses:
GERTRUDE T. PORTER,
MAY T. McGARRY.